United States Patent [19]

Kamata et al.

[11] Patent Number: 4,597,798
[45] Date of Patent: Jul. 1, 1986

[54] METHOD FOR DISSOLVING CELLULOSE IN ORGANIC SOLVENTS AND RESULTING CELLULOSE SOLUTIONS

[75] Inventors: Masami Kamata; Iwao Tabushi, both of Kyoto; Saichi Morimoto, Tsuruga; Takashi Asaeda, Jyoyo; Yoshikazu Aoki, Otsu, all of Japan

[73] Assignee: Tachikawa Research Institute, Kyoto, Japan

[21] Appl. No.: 686,376

[22] Filed: Dec. 26, 1984

[30] Foreign Application Priority Data

Dec. 26, 1983 [JP] Japan ................................. 58-249468

[51] Int. Cl.$^4$ ................................................ C08L 1/00
[52] U.S. Cl. .................................................... 106/203
[58] Field of Search ................................ 106/203, 186

[56] References Cited

U.S. PATENT DOCUMENTS

| | | | |
|---|---|---|---|
| 1,771,462 | 7/1930 | Lilienfeld | 106/203 |
| 1,943,176 | 1/1934 | Graenacher | 106/203 |
| 2,070,999 | 2/1937 | Powers | 106/203 |
| 4,416,698 | 11/1983 | McCorsley | 106/203 |

*Primary Examiner*—Theodore Morris
*Attorney, Agent, or Firm*—Browdy and Neimark

[57] ABSTRACT

Method for preparing a cellulose solution wherein cellulose is dissolved in a mixed solvent which is consisted essentially of an aliphatic quaternary ammonium halide, containing a lower alkyl group and a halogen, and an organic solvent capable of dissolving the halide. The dissolving process must be carried out within a heating temperature range, between 50° C. and 100° C., particularly preferable between 70° C. and 95° C., so as to keep the degree of polymerization of the cellulose at a high level.

21 Claims, No Drawings

METHOD FOR DISSOLVING CELLULOSE IN ORGANIC SOLVENTS AND RESULTING CELLULOSE SOLUTIONS

BACKGROUND OF THE INVENTION

1. Field of the Invention

The present invention relates to a method for preparing a cellulose solution, which can be made into various products such as filaments, fibers, films, membranes, etc., by means of using a new organic solvent system.

2. Description of the Prior Art

Various studies and experiments have in recent years been made aiming to prepare some cellulose solutions, which may produce various articles having desired shapes, by dissolving cellulose in an organic solvent. Principal objects of those studies and experiments can be summarized into two groups: (1) A first of them is conceived to provide a new production equipment original or unique enough to replace the traditional viscose method, in respect to reducing the investment cost and decreasing the controversial environment contamination. This object is to be attained by collecting and uniting the production processes into a simple style. (2) And a second group is conceived to provide various new cellulose products having excellent features, without chemically changing or denaturing the cellulose itself and decreasing or degrading so much the degree of polymerization thereof. This object can be achieved by making the cellulose dissolve in an organic solvent at a high degree of concentration.

The inventors who had carefully studied most of known representative methods for dissolving cellulose came however to a conclusion that each of them can not be free from some shortcomings, while being advantageous in some respects. Some methods are still defective, because the then used solvent itself constitutes an environment-contaminating matter; some are too expensive for being carried into practical use; some are difficult in the handling of the solvent or in the recovery of the same; in some other methods the cellulose itself cannot escape from being affected by a chemical change and thereby greatly sacrificing the desired high degree of polymerization thereof.

Further, according to the following reports: (1) a patent specification of U.S. Pat. No. 1,943,176; and (2) an article entitled "N-Äthyl-pyridinium-chlorid als Lösungsmittel und Reaktionsmedium für Cellulose", Von E. Huseman und E. Siefelt, [Die Makromolekulare Chemie, 128 (1969) Seite 288–291], cellulose is dissolved with N-ethyl pyridinium chloride, which can be obtained by treating pyridine with ethyl chloride, either applied alone or in combination with any solvent. The above introduced traditional method is referred to as EPy.Cl process for short. This very EPy.Cl process is also intrinsically involved in the aforementioned problems a great deal, and thereby far from being satisfactory as a practical manufacturing process of a cellulose solution.

SUMMARY OF THE INVENTION

It is therefore an object of the present invention to provide an organic solvent which is free from environmental contamination or pollution, easy in its handling and recovering, and as inexpensive as possible, and which is thereby capable of producing cellulose solution to be formed into articles of various shapes.

In the course of a long series of laborious studies and experiments for obtaining organic solvents satisfying the above-mentioned features, the inventors discovered that several organic solvents are capable of, in the pressure of suitable salts, dissolving cellulose at a relatively low temperature and yet at a considerably high concentration thereof. Another discovery by the inventors was the fact that such cellulose solutions, when being contacted with a poor solvent or non-solvent, can quantitatively produce cellulose products without changing the proper quality of the cellulose and thereby sacrificing the polymerization degree thereof.

This invention which was made from such discoveries can be summarized as a method for preparing a cellulose solution comprising dissolution of cellulose with a mixed solvent consisting essentially of at least one aliphatic quaternary ammonium halide having a formula: $R_1R_2R_3R_4NX$, wherein each of $R_1$, $R_2$, $R_3$ and $R_4$ is a lower alkyl group and X is a halogen, and at least one organic solvent capable of dissolving the above-mentioned at least one aliphatic quaternary ammonium halide.

DETAILED DESCRIPTION OF THE INVENTION

In the above-designated formula, each of $R_1$, $R_2$, $R_3$ and $R_4$ is preferably a methyl, ethyl or propyl group and X is preferably a chlorine, fluorine or bromine. More specifically, thorough study of the inventors seeking appropriate salts as an additive reached a conclusion that aliphatic quaternary ammonium halides such as below listed are best suited:

tetraethyl ammonium chloride (TEAC);
tetraethyl ammonium fluoride (TEAF);
methyltriethyl ammonium chloride;
propyltriethyl ammonium choride;
parts of TEAC can be substituted with tetraethyl ammonium bromide (TEAB).

Such aliphatic quaternary ammonium halide(s) is (are) mixed with the specific organic solvent(s) to be generally within the range of 20–70% be weight, preferably 30–55% by weight, based on the thus formed mixed solvent.

Combination of the aliphatic quaternary ammonium halide(s) and organic solvent(s) is greatly helpful in eliminating the existing shortcomings, being not only inexpensive but also easy to handle. In this method, neither deterioration of the cellulose nor contamination of the environment are observed.

As to the organic solvent suitable to the purpose of the invention, the inventors found dimethyl sulfoxide (DMSO) particularly excellent. Tetramethylene sulfoxide (TMOS) is similarly usable. Either one of pyridine or dimethyl formamide (DMF) is also, when made into a mixture with DMSO, suitable for the purpose. Combination of the above-mentioned TEAC and DMSO is particularly good in respect to its dissolubility. It is in fact able to dissolve cellulose such as wood pulp and natural cellulose, e.g. cotten linter, etc., which preferably has the degree of polymerization thereof not less than 400, available on the market into a limpid and lucid solution. In addition to this capability its dissolving velocity is very high.

The cellulose solution obtained in this invention is colorless, odorless, non-volatile, transparent and neutral; the degree of polymerization observed in the dissolved cellulose is not noticeably decreased or degraded. This kind of cellulose solution can be, when contacted with a poor solvent in an ordinary way, formed into products or regenerated cellulose, e.g., filaments, fibers, films, membranes, etc. If the poor solvent used happens to be water, methanol, or ethanol, the ammonium salt and DMSO can be speedily and easily eluted or dissolved out from the cellulose solution.

Since the above-mentioned TEAC is, in water or DMSO, stable even at a high temperature, for example, from 130° C. to 150° C., cellulose-dissoluble DMSO solution containing the TEAC can be, by means of removing therefrom water or alcohol through distillation, recovered so as to be repeatedly used for the purpose of cellulose dissolution.

Dissolving cellulose according to this invention is preferably effected by heating the mixed solvent to which cellulose is added, under the temperature where the degree of polymerization of said cellulose cannot be decreased. In this case, heating temperature of the mixed solvent for dissolving cellulose is within the range between 50° C. and 100° C., being particularly preferable to be from 70° C. to 95° C. At a temperature lower than 50° C. cellulose becomes hardly dissoluble; at a temperature higher than 100° C., on the other hand, tends to deteriorate the polymerization degree of the cellulose.

The process in the present invention, wherein cellulose is dissolved with the mixed solvent of tetraethyl ammonium chloride (TEAC) and DMSO, will be hereinafter referred to as TEAC process against the traditional process introduced in the prior art as EPy.Cl process. The above-mentioned two processes, EPy.Cl and TEAC, are truly in close resemblance to each other in respect to the employment of a quaternary ammonium compound having tetravalent nitrogen atom, but the two closely related compounds are, irrespective of their mutual proximity, fundamentally different in structure. In the former EPy.Cl process, a pyridine nucleus, constituting raw material to be processed, has therein double bonds between nitrogen atom and its neighboring carbon atom, which double bonds being kept intact in the resulting EPy.Cl, whereas in the latter TEAC process of the present invention four ethyl radicals are situated on the vertexes of a regular tetrahedron having nitrogen atom at its center of gravity. It can be safely said that the EPy.Cl having the double bonds and the TEAC with no double bonds are categorically or decisively different compounds, as can be clearly seen in the chemical constitutional formulas below:

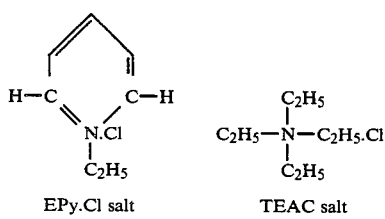

EPy.Cl salt      TEAC salt

Between the said two solvents remarkable difference can be, in respect to their dissolubility for cellulose, observed as undermentioned owing to their respectively characteristic chemical structure. Results obtained in the comparative study and tests of the cellulose dissolubility, performed between EPy.Cl process and TEAC process, using pulp of DP 750 are as follows:

(1) In the comparison of the preferable cellulose concentration for each solvent, the EPy.Cl process showed 7% as the upper limit of cellulose concentration, under which no spinning troubles took place, while the TEAC process showed 12%. This means that the solubility of cellulose in the present process is 1.7 times as large as that in the EPy.Cl process.

(2) It took about one hour to dissolve 7% of cellulose in the mixed solvent at a temperature of 100° C. in the EPy.Cl process, while half an hour was enough to dissolve the same in the TEAC process. This signifies that the celluloe dissolving speed of the present process is approximately double that of the EPy.Cl process.

(3) Comparison of the solution appearance, between 7% solution in the EPy.Cl process and 12% solution in the present TEAC process, performed under a microscopic examination, showed the results as follows:

in case of the EPy.Cl process, 30-40 dotted insoluble substances and 4-5 insoluble and swollen cellulose fibers were observed in a unitary visual field of the microscope;

in case of the present process, on the other hand, none of such substances were found there.

(4) Comparison of both solutions obtained in (1) in respect of their appearance showed that the solution in the EPy.Cl process was obviously colored while the solution in the present process was colorless and transparent.

(5) The upper limit of the polymerization degree for the material cellulose was compared, in addition to the above four items, between both processes, under which satisfactory spinning could be performed. The results were 750 or so for the Epy.Cl process and at least 900 for the present process.

As defined in detail above, a remarkable difference of solubility, more exactly the degree of solubility, of cellulose can be observed between both processes, i.e., EPy.Cl and TEAC. This fact especially proves the excellent features of the TEAC process when it is put into the practical industrial production. The superiority or merit of the TEAC process over the EPy.Cl process in respect of miniaturization of the equipment, simplification of the filtration process, stability of spinning process, improvement in the quality of final fiber products, and so on is immeasurably great. Some other merits of the present process must be given by way of example here in regard to the superiority of TEAC salt in the TEAC process over EPy.Cl salt in the EPy.Cl process: the former is much stabler than the latter as a salt; much easier in the handling; by far less expensive in the price as a chemical.

Now, several examples of this invention will be described in detail hereunder. It goes without saying that the disclosure of these examples is by no means to limit the invention to those examples; on the contrary, this invention will contain all of the modifications or variations which could be thought of by those skilled in the art provided that they do not depart from the spirit and scope of the present invention.

EXAMPLE 1

Finely cut sulfite pulp for viscose of DP (degree of polymerization) 900 was dried at 90° C. for three hours under reduced pressure, for being made into material cellulose, DMSO was added to the anhydrous tetraethyl ammonium chloride (TEAC) got on the market, and the mixture of the DMSO and the TEAC was heated while being stirred until the TEAC was dissolved. Then four kinds of solvent were prepared from the said mixture, such that they might be in the TEAC concentration respectively 30, 35, 40, and 45% by weight. Thereafter the already made material cellulose was added to each of the solvents, one by one; each solvent was heated at a temperature 90°-100° C., while being stirred, so as to dissolve the cellulose before obtaining a solution, in each case, of six % cellulose concentration by weight. The time required for the dissolution of the cellulose was sixty minutes. The results of the experiments is shown on TABLE 1.

TABLE 1

| Conc. of TEAC in mixed solvent | Conc. of cellulose in solution | Observation by microscope (magnification 100) |
|---|---|---|
| 30% by weight | 6% by weight | clear solution free from insoluble substance |
| 35% by weight | 6% by weight | clear solution free from insoluble substance |
| 40% by weight | 6% by weight | clear solution free from insoluble substance |
| 45% by weight | 6% by weight | clear solution free from insoluble substance |

Moreover, in relation to the above TABLE 1, following points were incidentally ascertained.
(1) Any viscosity of the cellulose solutions was:
   at 100° C. approximately 290 sec. and
   at 70° C. approximately 600 sec.
It is indicated by the number of second required for a steel ball of $\frac{1}{8}''$ in diameter to fall down the distance of 20 cm.
(2) DP of the regenerated film from the solution: ca. 800
(3) The infrared spectrum of the regenerated film showed that the film was consisted of hydrated cellulose.
(4) The NMR spectrum showed the TEAC recovered from the solution was not decomposed.

EXAMPLE 2

Water was added to the mixed solvent for dissolving cellulose, prepared in accordance with EXAMPLE 1, such that water amounted in one case to 2-3% by weight and in another to 4-5% by weight. To those solvents containing water at a predetermined concentration, material cellulose according to EXAMPLE 1 was put so as to make the cellulose concentration 6% by weight. Observation was then made for finding or measuring the influence of water to the solubility of cellulose. The results are displayed on TABLE 2.

TABLE 2

| Conc. of TEAC in the mixed solvent | Conc. of cellulose in solution | Water content in solution 2-3% by weight | Water content in solution 4-5% by weight |
|---|---|---|---|
| 45% by weight | 6% by weight | cellulose dissolved | cellulose not dissolved |
| 55% by weight | 6% by weight | cellulose dissolved | cellulose not dissolved |
| 65% by weight | 6% by weight | cellulose dissolved | cellulose not dissolved |

However, in the case wherein the concentration of TEAC in the mixed solvent was 70% and the concentration of cellulose in the solution was 4%, cellulose could be dissolved even at a high content of the added water as 4-5% by weight.

EXAMPLE 3

Slices of fine chips of pulp (DP 900) were immersed in DMSO, a kind of pretreatment agent, until the pulp was impregnated enough therewith. The DMSO was pressed out so as to remove the excess until the weight of the pulp reached about two times as great as the original one. This pulp was dissolved with the TEAC-DMSO mixed solvent according to the process in EXAMPLE 1, and the solution produced at a temperature of 100° C. was 40% by weight in TEAC concentration and 9% by weight in cellulose concentration. The solubility of the cellulose at this time was by far improved as compared to the case without the pretreatment, with a result of producing satisfactory solution containing perfectly dissolved cellulose in such a short time as less than twenty minutes.

EXAMPLE 4

Sulfate pulp (DP 400) was preliminarily dried and applied the pretreatment according to the process in EXAMPLE 3, but the immersion temperature was then 90° C. By treating the pulp with the TEAC-DMSO mixed solvent a limpid solution containing satisfactorily dissolved cellulose at a concentration of 15% by weight and TEAC at a concentration of 45% by weight was obtained at a temperature of 100° C.

EXAMPLE 5

Dihydrate of tetraethyl ammonium fluoride (TEAF) commercially available was preliminarily dried at a temperature of 70° C. for three hours under reduced pressure so as to obtain its anhydride. The original water content of the dihydrate of TEAF was figured out to correspond to 2.1 $H_2O$ based on the calcuration made from the amount of reduced weight during the process. By using such anhydride of TEAF clear and limpid solution of 35% TEAF and 5% satisfactorily dissolved cellulose was obtained, wherein the polymerization degree of the material cellulose was 900 and the solution temperature 90° C.

EXAMPLE 6

Two of the synthesized agents, i.e., methyltriethyl ammonium chloride and propyltriethyl ammonium chloride were respectively dissolved in DSMO for getting new mixed solvents of the ammonium chloride with 40% concentration. Cellulose of DP 900 was dissolved in those mixed solvents respectively at a temperature of 90° C. The then produced solutions were clear and limpid containing therein satisfactorily dissolved celulose at a concentration of 6%.

EXAMPLE 7

Tetramethylene sulfoxide (TMSO) turned out to be good as an organic solvent for TEAC. By using this solvent a mixed solvent containing 40% TEAC could be obtained. Cellulose pulp of DP 900 was dissolved therein at a temperature of 90° C. such that cellulose concentration could reach 6%. The then produced solution was clear and limpid, contained cellulose being satisfactorily dissolved.

EXAMPLE 8

In a mixture of 40% pyridine and 60% DMSO, TEAC was dissolved so as to make the concentration of TEAC therein 40%. Cellulose pulp of DP 900 was dissolved in the above-mentioned mixed solvent at a temperature of 90° C. The then produced solution having the cellulose satisfactorily dissolved at a concentration of 6% therein was clear and limpid.

EXAMPLE 9

In a mixture of 40% dimethylformamide (DMF) and 60% DMSO, TEAC was dissolved so as to make the concentration of TEAC therein 40%. Cellulose pulp of DP 900 was dissolved in this mixed solvent at a temperature of 90° C. The then produced solution containing satisfactorily dissolved cellulose at 6% concentration was clear and limpid.

EXAMPLE 10

Tetraethyl ammonium chloride (TEAC) and N-ethyl pyridinium chloride (EPy.Cl) were respectively dissolved in DMSO for preparing two mixed solvents. The dissolving power or dissolubility of those solvents was tested for comparison by means of using preliminarily dried pulp (DP 750) at a cellulose concentration respectively suitable to either solvent.

(1) In case of TEAC
Concentration of TEAC: 36%
Concentration of cellulose: 12%
Temperature of solution: 100° C.

In the course of the dissolving process of one hour under stirring, the cellulose was completely dissolved into a clear solution leaving no insoluble substance.

(2) In case of EPy.Cl
Concentration of EPy.Cl: 47%
Concentration of cellulose: 7%
Temperature of solution: 100° C.

In the course of the dissolving process of one hour under stirring, the cellulose was almost all dissolved, but the solution was unclear still leaving therein considerable amount of insoluble swollen fibers which could be detected under microscopic examination.

What is claimed is:

1. A method for preparing a cellulose solution comprising the steps of dissolving cellulose with a mixed solvent consisting essentially of at least one aliphatic quaternary ammonium halide having a formula: $R_1R_2R_3R_4NX$, wherein each of $R_1$, $R_2$, $R_3$, and $R_4$ is a lower alkyl group and X is a halogen, and at least one organic solvent selected from the group consisting of dimethyl sulfoxide and tetramethylene sulfoxide.

2. The method as set forth in claim 1, wherein said dissolving operation is effected by heating under the temperature where the degree of polymerization of said cellulose can not be decreased.

3. The method as set forth in claim 1, wherein said each of $R_1$, $R_2$, $R_3$ and $R_4$ is selected from a group consisting of methyl group, ethyl group and propyl group.

4. The method as set forth in claim 1, wherein said X is selected from a group consisting of chlorine, fluorie and bromine.

5. The method as set forth in claim 1, wherein said at least one organic solvent is dimethyl sulfoxide and/or tetramethylene sulfoxide.

6. The method as set forth in claim 1, wherein said at least one organic solvent is consisted of dimethyl sulfoxide with pyridine or dimethyl formamide.

7. The method as set forth in claim 1, wherein concentration of said at least one aliphatic quaternary ammonium halide in said mixed solvent is within the range of 20-70% by weight.

8. The method as set forth in claim 1, wherein concentration of said at least one aliphatic quaternary ammonium halide in said mixed solvent is within the range of 30-55% by weight.

9. The method as set forth in claim 1, wherein cellulose concentration in said cellulose solution is not less than 3% by weight.

10. The method as set forth in claim 1, wherein the degree of polymerization of cellulose is not less than 400.

11. The method as set forth in claim 2, wherein the heating temperature is within the range of 50°-100° C.

12. The method as set forth in claim 2, wherein the heating temperature is within the range of 70°-95° C.

13. A cellulose solution prepared by dissolving cellulose with a mixed solvent consisting essentially of at least one aliphatic quaternary ammonium halide having formula: $R_1R_2R_3R_4NX$, wherein each of $R_1$, $R_2$, $R_3$ and $R_4$ is a lower alkyl group and X is a halogen, and at least one organic solvent selected from the group consisting of dimethyl sulfoxide and tetramethylene sulfoxide.

14. The cellulose solution as set forth in claim 13, wherein said at least one organic solvent is dimethyl sulfoxide and/or tetramethylene sulfoxide.

15. The cellulose solution as set forth in claim 13, wherein said at least one organic solvent is consisted of dimethyl sulfoxide with pyridine or dimethyl formamide.

16. The cellulose solution as set forth in claim 13, wherein concentration of said at least one aliphatic quaternary ammonium halide in said mixed solvent is within the range of 20-70% by weight.

17. The cellulose solution as set forth in claim 13, wherein concentration of said at least one aliphatic quaternary ammonium halide in said mixed solvent is within the range of 30-55% by weight.

18. The cellulose solution as set forth in claim 13, wherein cellulose concentration in said cellulose solution is not less than 3% by weight.

19. The cellulose solution as set forth in claim 13, wherein the degree of polymerization of cellulose is not less than 400.

20. The cellulose solution as set forth in claim 13, wherein further contains an amount of water of not more than 4% by weight.

21. The cellulose solution as set forth in claim 13, wherein further contains an amount of water of not more than 2% by weight.

* * * * *

UNITED STATES PATENT AND TRADEMARK OFFICE
CERTIFICATE OF CORRECTION

PATENT NO.    : 4,597,798
DATED         : July 1, 1986
INVENTOR(S)   : KAMATA et al It is certified that error appears in the above-identified patent and that said Letters Patent is hereby corrected as shown below:

Column 2, line 4:  change "sure" to read --ence--;

line 53:  change "(TMOS" to read --(TMSO)--.

Signed and Sealed this

Eleventh Day of November, 1986

*Attest:*

DONALD J. QUIGG

*Attesting Officer*     *Commissioner of Patents and Trademarks*